Aug. 18, 1931.  R. E. OTTENHEIMER  1,819,568
REFRIGERATING APPARATUS
Filed Dec. 19, 1927  5 Sheets-Sheet 4
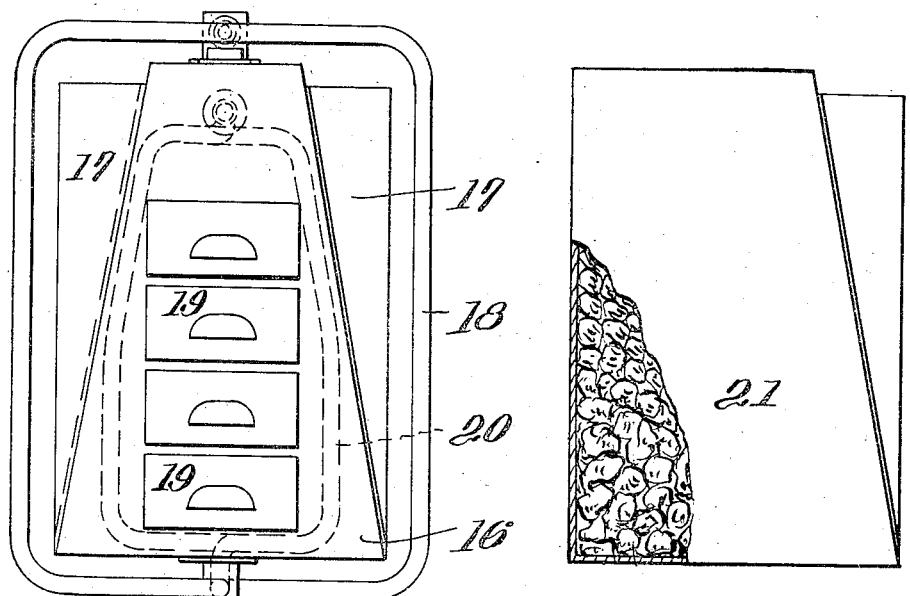
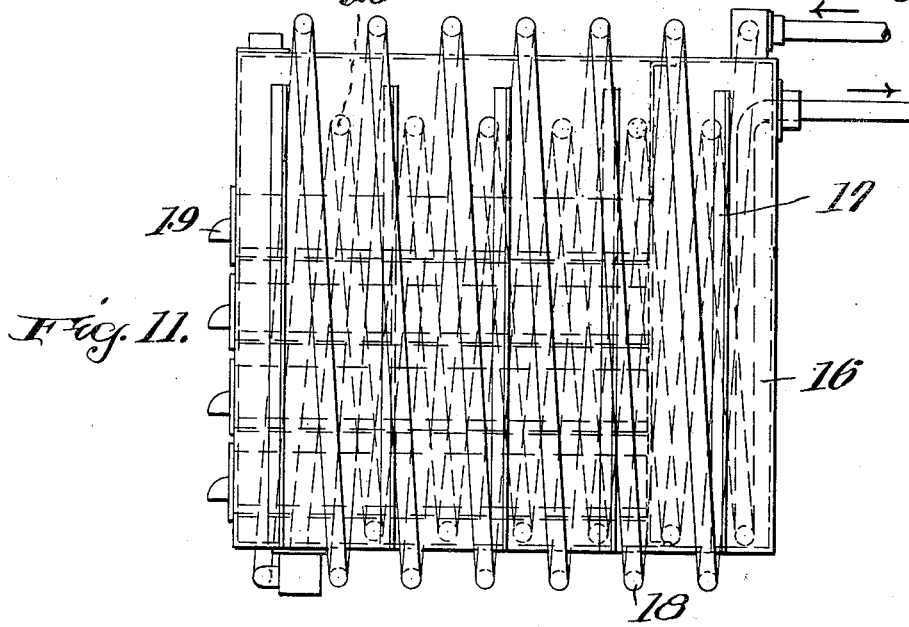
Inventor
REUBEN E. OTTENHEIMER,
Attorneys

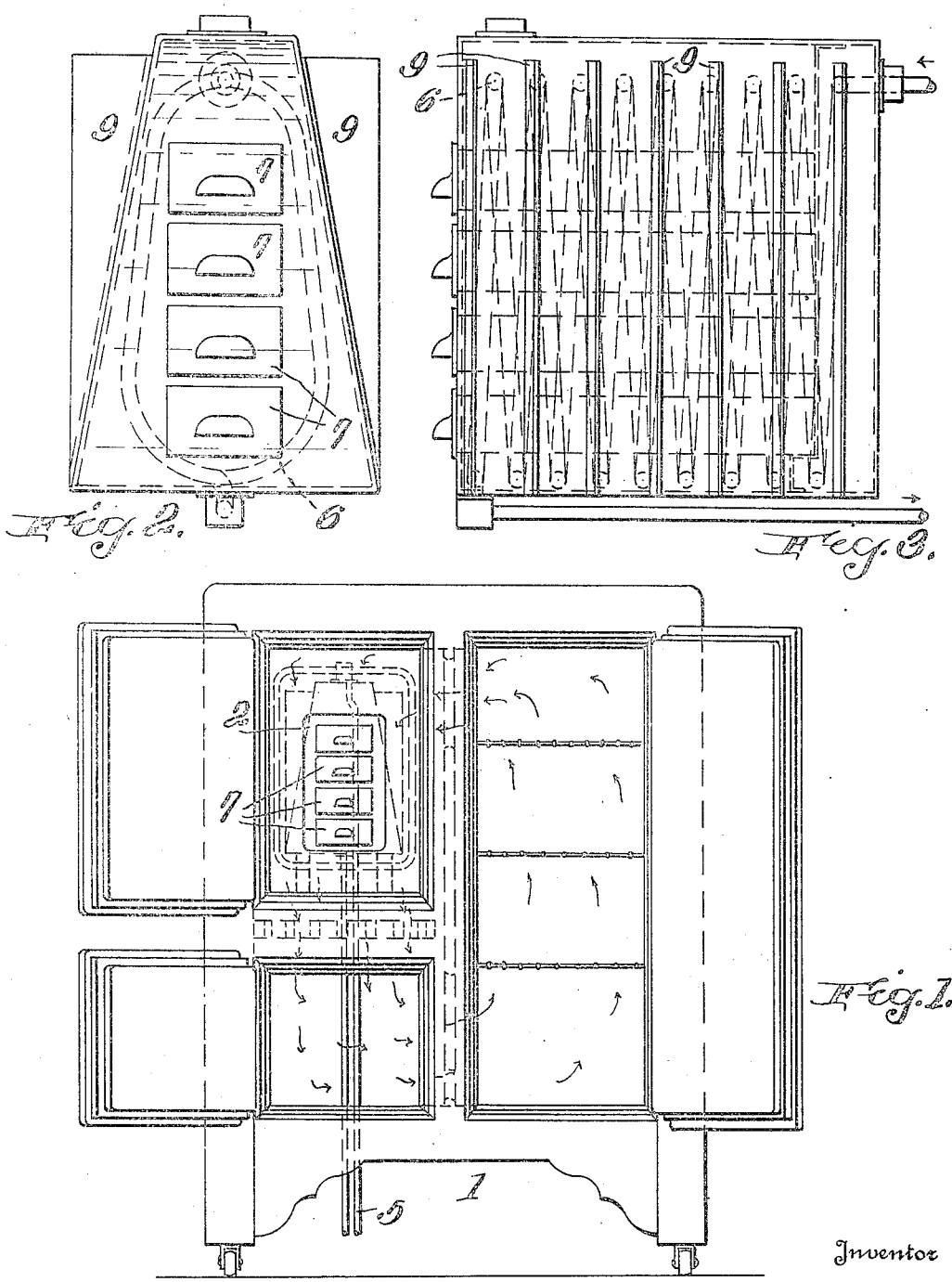

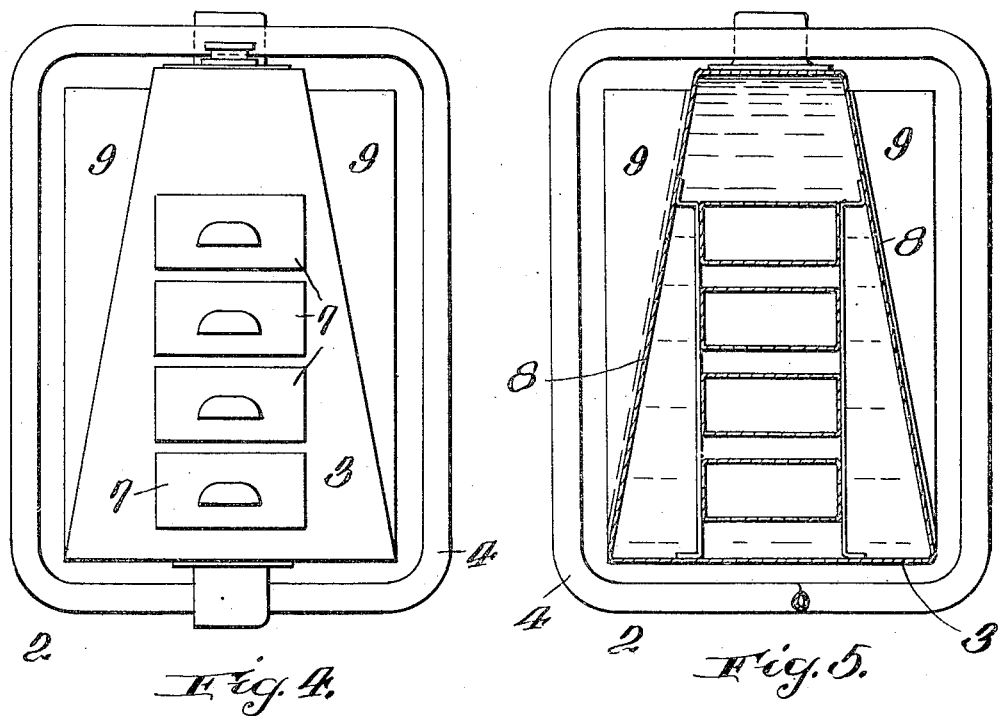
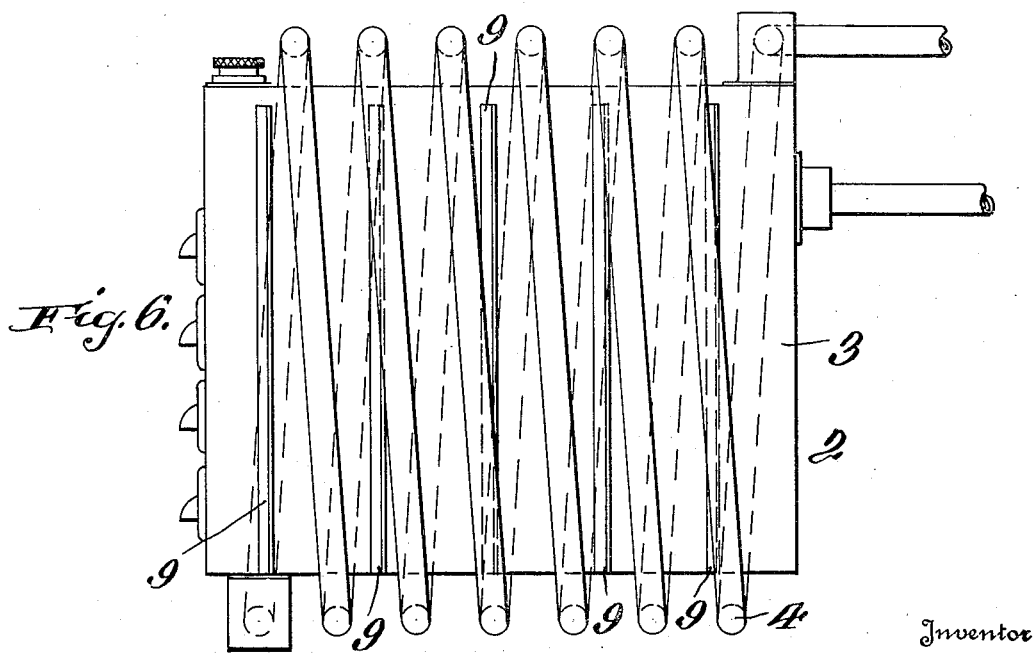

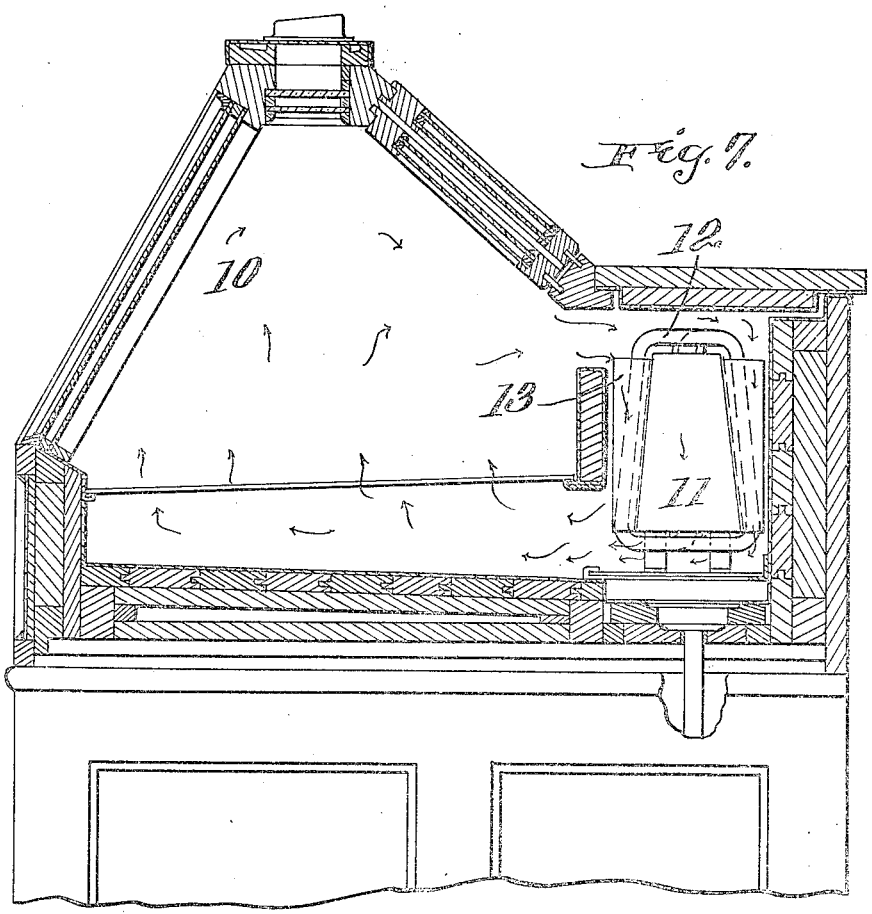
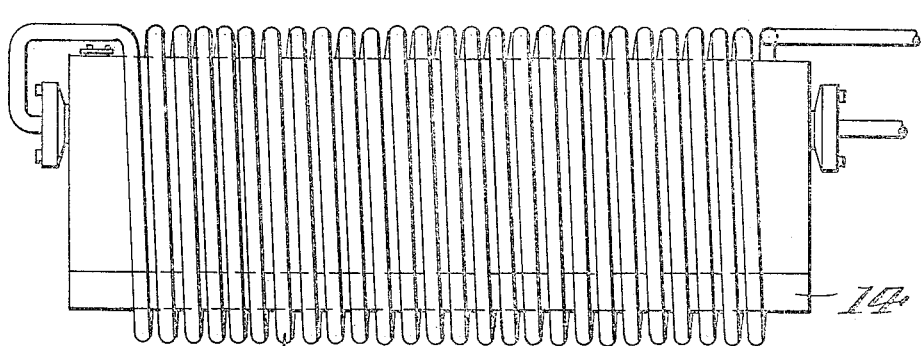

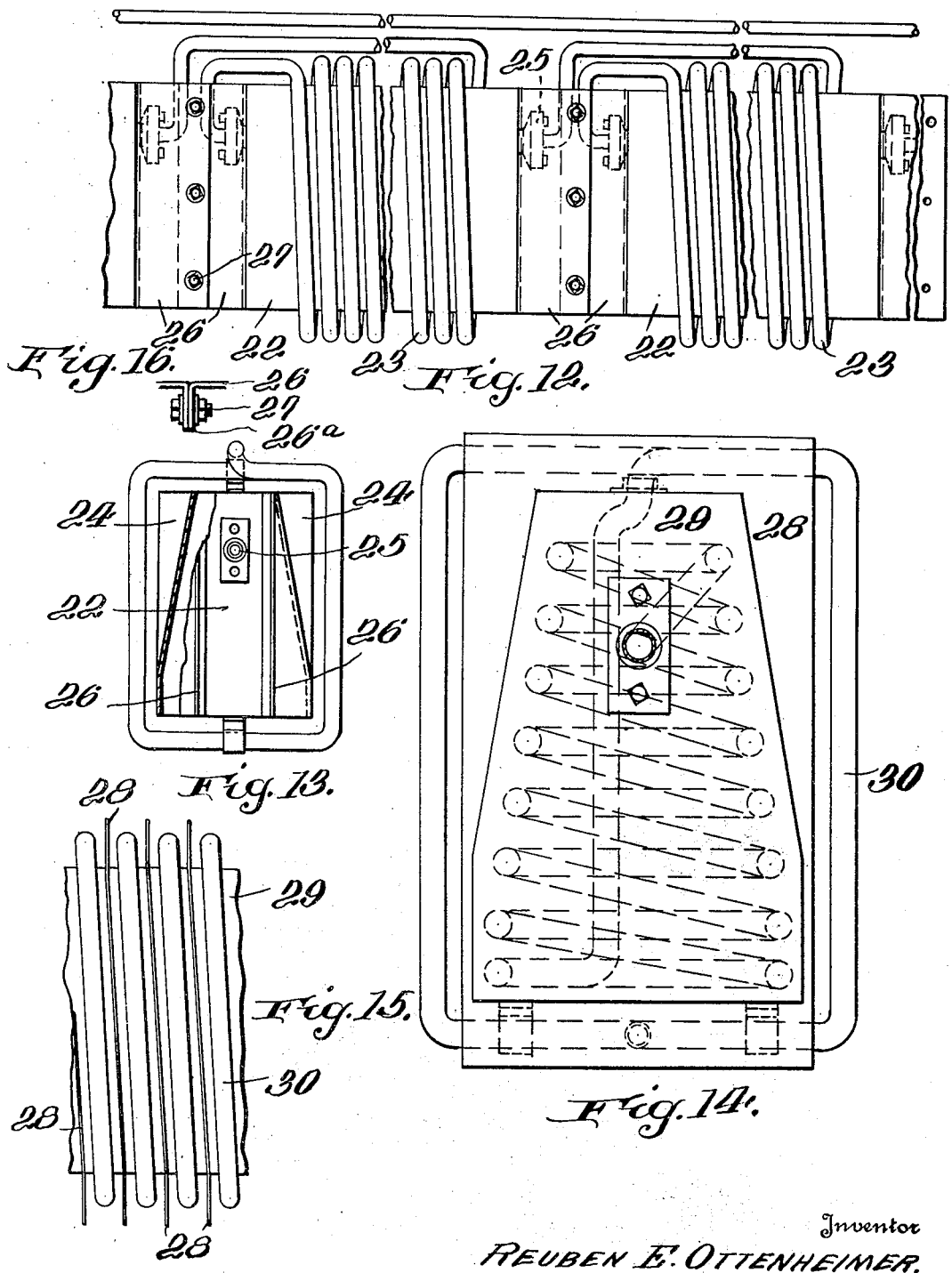

Patented Aug. 18, 1931

1,819,568

UNITED STATES PATENT OFFICE

REUBEN E. OTTENHEIMER, OF BALTIMORE, MARYLAND

REFRIGERATING APPARATUS

Application filed December 19, 1927. Serial No. 241,101.

This invention relates to refrigerators and its primary object is to provide a refrigerating unit or mechanism, of such form that an accelerated flow of air will be established through the refrigerating space thereby obtaining greater efficiency than was heretofore possible with a low-temperature refrigerant. This refrigerating unit will be arranged ordinarily to accelerate a downward flow through a normal thermo-siphonic path, but may be arranged, in event of change of direction of such flow, to accelerate same in whatever line the flow takes.

Another object is to provide a refrigerating mechanism which is well adapted for domestic and commercial use, and which may be employed in units or in a series of units, and it is also an object to provide maximum radiating surface on the refrigerating tank and thereby minimize the accumulation of frost.

Other objects will appear incidentally in the course of the following description, and the invention resides in certain novel features which will be particularly defined in the appended claims.

In the annexed drawings several embodiments of the invention are shown:—

Fig. 1 is an elevation of a refrigerating mechanism installed in a domestic refrigerator or provision box;

Fig. 2 is a front end elevation of a tank and coils differing in arrangement from the mechanism shown in Fig. 1;
Fig. 3 is a side elevation of the mechanism shown in Fig. 2;

Fig. 4 is an enlarged front elevation of the mechanism shown in Fig. 1, but with coils in a slightly different arrangement;
Fig. 5 is a transverse section of the structure shown in Fig. 4;

Fig. 6 is a side elevation of the same;

Fig. 7 is a sectional elevation of a refrigerating showcase having the invention embodied therein;

Fig. 8 is an elevation of one form of commercial apparatus;

Fig. 9 is a front elevation of a slightly modified apparatus;
Fig. 10 is an elevation of another modification in which ice and salt may be used, no coils being shown;

Fig. 11 is a side elevation of the mechanism shown in Fig. 9;

Fig. 12 is a view showing a series of mechanisms coupled together for commercial use;

Fig. 13 is an end elevation of an open ended metal form shaped similarly to the mechanism shown in Fig. 12 and disclosing a means for coupling the form to another;

Fig. 14 is an end elevation showing another form of mechanism;

Fig. 15 is a plan view of a part of the mechanism shown in Fig. 14;

Fig. 16 is a detail plan of a modified connecting means for the mechanism shown in Figs. 12 and 13.

Referring particularly to Fig. 1, the numeral 1 designates a conventional domestic provision or refrigerator box having refrigerating mechanism 2 installed therein, which mechanism may be either a refrigerating low-side, or a brine tank or a container of a solid refrigerant such as ice and salt, etc., in fact any suitable refrigerating means, the box having a partition therein, as usual, through the upper portion of which is an opening to permit the warm air to be circulated over the refrigerating mechanism, as indicated by the arrows. The refrigerating mechanism includes a tank 3 for brine or suitable medium and a refrigerating coil arranged in conjunction therewith, the tank being preferably sealed and filled with any low temperature retaining material, and the coil forming a part of the system through which the refrigerant, such as anhydrous ammonia, sulphur dioxide, or low temperature brine circulates. It will be understood that the refrigerant absorbs heat from the surrounding air or other medium and then flows to and through cooling coils where it loses its acquired heat and is then compressed and driven back to the refrigerating coils. The cooling coil, compressor and motor are generally located below the refrigerator box and are often placed in the cellar of the building but they are not a part of the present invention, and are not illustrated, although a portion of the circulating pipes is indicated at 5. The coils may be arranged either within or without the tank or both, and in Figs. 4, 5 and 6 are shown as encircling the tanks externally, while in Figs. 2 and 3 the coil 6 is indicated as being housed within the tank. The coils may be disposed in various shapes which will define the desired tortuous path for the refrigerant and in my application, Serial No. 241,102 filed simultaneously herewith, I have presented claims to novel features of the coils.

The tank may be formed internally to provide supports for the usual ice trays 7, and it is substantially triangular in cross section, as clearly shown in Figs. 2, 3, 4 and 5, its side walls 8 diverging downwardly, which formation accelerates the downward flow of air adjacent the tank, inasmuch as the sides of the tank approach the walls of the compartment containing it and, therefore, effect a Venturi action. While the illustration shows a downward divergence of the walls it is obvious that the intent of this invention is to accelerate flow in whatever direction the flow may go, and the term downward is not intended to be restrictive as the walls will diverge in the line of flow regardless of whether the flow is normally thermo-siphonic or mechanically directed along other than normal lines. In other words, the apex of the refrigerating means will be pointed into the line of flow regardless of what direction the flow occurs. The air in the provision box, consequently, is caused to circulate rapidly and completely so that the desired low temperature is quickly reached and easily maintained. The rapid flow of air over the sides of the tank retards the formation of frost and minimizes the accumulation thereof so that the full benefit of the refrigerating process is had with a minimum upkeep cost. To facilitate and heighten the acceleration of the air currents, fins or deflectors 9 are provided on the sides of the tank to extend at intervals along the same. These fins are deflectors may be of any preferred shape and may be plates secured upon and projecting from the tank or may be hollow ribs pressed in from the sides thereof but, whatever their form, they increase the radiating surface of the tank and the spaces between adjacent fins may serve as flues creating drafts to enhance the circulation of the air.

It will be obvious that a metal form may be used in lieu of a tank as such and this form may be open ended from top to bottom. Such an arrangement is hereinafter described. In fact, the generally triangular configuration of the mechanism may be defined by the coils per se.

In Fig. 7, the invention is shown installed in a refrigerating showcase 10, the tank 11 being of the same triangular form shown in Figs. 2, 3, 4 and 5 and the external refrigerating coils 12 being shown as in the form of continuous turns or coils passing around the tank and between adjacent fins 13. In Fig. 8 is shown an elongated tank 14 without fins and the coil 15 is a continuous spiral passing around the tank from end to end thereof with several turns closely spaced.

In Figs. 9 and 11, the tank 16 has the external fins 17 and the coil 18 is disposed entirely outside of the fins and is also extended into the tank and carried around the ice trays 19 as shown at 20, the inner coils being properly shaped to conform to the contracted space in the upper portion of the tank. The tank 21, shown in Fig. 10, differs from other described forms in omitting the ice trays and the inner coil. In this form it will be noted that one wall is substantially contained in a vertical plane, as in the conventional tank, but at least one other of the walls is shown as diverging downwardly from the remaining walls. This figure also illustrates the use of a solid refrigerant such as ice and salt, solid carbon dioxide, etc., rather than a liquid refrigerant.

In Fig. 12, a plurality of tanks 22 are shown coupled together and the coils 23 are connected into the tanks, it being possible in this manner to readily provide a commercial mechanism of any desired size. Each tank 22 is of the triangular form heretofore described and is equipped with fins 24, and at its ends has collars or fittings 25 to facilitate the coupling of the coils thereto and permit the coils to be carried through the tanks. Each tank also has plates or brackets 26 at its ends, the plates on the end of one tank overlapping the plates on the meeting end of an adjacent tank and fastening bolts 27 being inserted through the overlapping marginal portions of the plates to securely connect the tanks. The coupling plates 26 may take the form of abutting angle irons to form an outstanding flange 26a, as shown in Fig. 16. By this arrangement additional radiating surface is provided between the coupled forms.

Fig. 13 illustrates a form having downwardly diverging walls, but in which form the top and bottom are open to permit a flow of air therethrough. In this form, of course, there will be no refrigerant within the tank but a circulation of brine or other suitable refrigerant will be maintained through the coils.

In Figs. 14 and 15, the fins 28 are extended above and below the tank 29 and the outer coil 30 has its transverse portions disposed between the upper and lower ends of adjacent fins which are slightly twisted, as shown in Fig. 15, to accommodate the turns of the coil. It may be noted that in Fig. 14, the fins are oblongs set on end while in the other disclosed forms of the invention, the fins are inverted right triangles, but the action is the same in all forms.

It will be noted, that while the shape of the tank, or coils, or both, is generally triangular, the portions forming the sides and hypotenuse of the triangle, do not necessarily have to be straight, but may be of a gradual curve, or in fact the entire cross section might be generally elliptical, and the action would be the same.

It will be seen then, that the refrigerating mechanism includes a form or tank which may be generally of any trapezoidal form, for example, one side may be in a vertical plane and another side generally divergent with respect thereto. This mechanism may be in the shape of a form which is open ended and acting merely to accelerate the flow of air over coils containing a brine or the like, or it may comprise the tank adapted to contain suitable liquid refrigerant or ice and salt, but regardless of whether a form is used or a tank, it will be obvious that the invention is the same, namely, a shape of generally triangular configuration designed to accelerate flow of air through a refrigerating chamber in which the device is placed.

The refrigerating mechanism and the chamber in which such mechanism is mounted are so designed and arranged relative to each other that advantage is taken of the entire cubic space of the chamber. That is to say, the shape of the form or tank is such as to accelerate the flow of air through the chamber without in any manner restricting or blocking such flow at the point where the wider portions of the form are mounted. All space about the form will be occupied by fins or coils in such a manner as to provide flues or passages for the air thereby. The refrigerating chamber is as completely filled with a refrigerating means as is possible without restricting flow of air even though the chamber is rectangular or square and advantage is taken of the entire cubic space of the chamber. Where a solid tank having one portion larger in cross section than another portion would restrict the air flow, by having a narrow trapezoidal tank or form which will not restrict the flow but will tend to accelerate the same, it is possible to extend from or around the form the fins or coils which are then perforce located within the accelerated thermo-siphonic flow of air.

It will be obvious, of course, that this invention may be used in any suitable refrigerating system whether of the expansion type or any other desired type, and I do not intend to be limited other than as defined in the appended claims.

Having thus described my invention, what I claim as new and desire to secure by Letters Patent of the United States is:—

1. A refrigerating mechanism including a tank of substantially triangular cross-section, the sides of said tank being adapted to direct fluid currents past said mechanism and a coil extending substantially from end to end of the tank.

2. A refrigerating mechanism including an air directing form of substantially triangular cross-section, and a coil disposed therearound.

3. A refrigerating mechanism including an air directing form of substantially triangular cross-section, and having a coil disposed therearound, and also having a coil passing therethrough.

4. A refrigerating mechanism including a form of substantially triangular cross-section, spaced fins on the sides of the form, and a coil extending along the form with some of its turns disposed in planes between adjacent fins.

5. A refrigerating mechanism including a form having downwardly diverging walls, spaced fins on said walls, and a coil extending along the form with some of its turns disposed in planes between adjacent fins.

6. A refrigerating mechanism including an air directing form of substantially triangular cross-section, and spaced fins extending from the sides of the form.

7. A refrigerating mechanism including an air directing form and a coil of substantially triangular conformation associated therewith.

8. A refrigerating mechanism comprising a refrigerating coil arranged in substantially triangular conformation, and air directing means mounted in spaced relation thereto.

9. A refrigerating mechanism including an air directing tank of substantially triangular cross-section and having a coil associated therewith and conforming substantially to the shape thereof.

10. A refrigerating mechanism including an air directing form of substantially triangular cross-section and having a coil arranged therein and conforming substantially to the shape thereof.

11. A refrigerating mechanism including an air directing form having downwardly diverging walls, and having coils arranged therein and therearound and one of said coils conforming substantially to the shape thereof.

12. A refrigerating mechanism including a tank and a coil of substantially triangular conformation associated therewith, said tank having fins disposed in planes between turns of the coil.

13. A refrigerating apparatus comprising a plurality of forms, means to couple said forms together, said forms being of generally triangular configuration in cross-section, and radiating means for said forms.

14. A refrigerating apparatus comprising a plurality of air directing forms coupled together, said forms having downwardly diverging walls and coils associated with the forms.

15. A refrigerating apparatus comprising a plurality of tanks, coupling plates secured on the ends of the tanks, the plates on the meeting ends of adjacent tanks being provided with outstanding portions, forming a radiating surface, and fastening devices inserted through adjacent marginal portions of the plates.

16. A refrigerating apparatus comprising a plurality of air directing forms of generally triangular configuration, coupled together, and refrigerating coils associated with the forms, said forms having radiating fins arranged in spaced relation to said coils.

17. A refrigerating apparatus comprising a plurality of tanks of generally triangular configuration, coupled together, and coils associated with the tanks, said coils being arranged to conform to the shape of the tanks.

18. A refrigerating mechanism comprising a tank and coils arranged to present a cross-section larger at the bottom than at the top, a side of said tank being adapted to direct fluid currents past said mechanism.

19. A refrigerator comprising a refrigerating mechanism, and a container therefor, air passages in said container, said mechanism having an air directing wall mounted in progressively decreasing spaced relation to a wall of the container to accelerate a generally downward movement of air through said passages.

20. In a refrigerator having a provision space and a refrigerating chamber, the combination with a refrigerating mechanism of generally triangular configuration, said mechanism having an air directing wall and being so disposed in said chamber as to accelerate the passage of air therethrough and through said space.

21. In a thermo-siphonic refrigerator provided with a provision space and an air cooling chamber, the combination with a refrigerating mechanism comprising a tank and coils, and having a side disposed in progressively decreasing spaced relation to a wall of said chamber to accelerate circulation of air through said refrigerator.

22. In a refrigerator having a provision space and a refrigerating chamber, the combination with a series of refrigerating mechanisms of generally triangular configuration, said mechanisms having portions disposed in progressively decreasing spaced relation to a wall of said chamber as to accelerate the passage of air therethrough and through said space.

23. In a thermo-siphonic refrigerator provided with a provision space and an air cooling chamber, the combination of a refrigerating mechanism comprising a plurality of tanks and coils coupled together, and having a side disposed in progressively decreasing spaced relation to a wall of said chamber to accelerate thermo-siphonic movements of air circulating through said refrigerator.

24. In a refrigerating mechanism a refrigerating chamber, an air directing form having one wall in a substantially vertical plane and another wall diverging downwardly from said first wall, said diverging wall being disposed in progressively decreasing spaced relation to a wall of said chamber to accelerate movements of air circulating in said chamber.

25. In a refrigerating mechanism including a form having downwardly diverging walls, and having heat radiating elements projecting from said walls, the combination with a plurality of coils arranged therein and therearound, the coils therein conforming substantially to the shape of the form and the coils therearound conforming substantially to the shape of the form as modified by the elements.

26. A refrigerating mechanism comprising an air directing form substantially triangular in cross section and having radiating means externally of one wall thereof.

27. A refrigerating mechanism including an air directing form having its walls diverging downwardly, and radiating means adjacent one of said diverging walls.

28. A refrigerating mechanism comprising an air directing form substantially triangular in cross section and having radiating means externally of one wall thereof, and a coil associated with said radiating means.

29. A refrigerating mechanism including an air directing form having its walls diverging downwardly, radiating means adjacent one of said diverging walls, and a coil associated with said radiating means.

30. A refrigerating mechanism comprising an air directing form substantially triangular in cross section and having radiating means externally of one wall thereof, a coil extending substantially from end to end of the form and adjacent the walls thereof.

31. A refrigerating mechanism comprising an air directing form and a coil, said form being larger at the bottom than at the top and having radiating means mounted thereon, said radiating means being larger at the top than at the bottom.

32. A refrigerating mechanism comprising an air directing form and a coil, said form being larger at the bottom than at the top, and having radiating fins extending along its walls.

33. A refrigerating mechanism comprising a tank and coils arranged to present a cross section larger at the bottom than at the top and having radiating means associated therewith, of a configuration larger at the top than at the bottom, a side of said tank being adapted to direct fluid currents past said mechanism.

34. A refrigerator comprising a refrigerating mechanism, and a container therefor, air passages in said container, and means providing air passages externally of said container, said mechanism having an air directing wall mounted in progressively decreasing spaced relation to a wall of the container to accelerate a generally downward movement of air through said passages.

35. In a refrigerator having a provision space and a refrigerating chamber, the combination with a refrigerating mechanism of generally triangular configuration and having radiating means on the walls thereof, said mechanism having an air directing wall and being so disposed in said chamber as to accelerate the thermo-siphonic action of air passing therethrough and past said radiating means.

36. In a thermo-siphonic refrigerator provided with a provision space and an air cooling chamber, the combination with a refrigerating mechanism comprising a tank and coils, having a side disposed in progressively decreasing spaced relation to a wall of said chamber to accelerate thermo-siphonic movements of air circulating through said refrigerator, and having radiating means disposed in the path of the circulating air.

37. In a refrigerating mechanism an air directing form having one wall in a substantially vertical plane, and another wall diverging downwardly from said first wall, and radiating means mounted on said second wall.

38. A refrigerating mechanism comprising a chamber, a form substantially triangular in cross section therein, and having a plurality of sides so disposed relative to the walls of said chamber as to accelerate fluid currents through said chamber.

39. A refrigerating mechanism comprising a chamber, a form therein having a plurality of downwardly diverging walls so disposed relative to the walls of said chamber as to accelerate fluid currents downwardly through said chamber.

40. A refrigerating mechanism comprising a chamber, a form substantially triangular in cross section therein, and having a plurality of sides so disposed relative to the walls of said chamber as to accelerate fluid currents through said chamber, and a coil associated with said form.

41. A refrigerating mechanism comprising a chamber, a form therein having a plurality of downwardly diverging walls so disposed relative to the walls of said chamber as to accelerate fluid currents downwardly through said chamber, and a coil associated with said form.

42. A refrigerating mechanism comprising a form and a coil, said form having a plurality of walls adapted to direct fluid currents downwardly past said mechanism, and said form being larger at the bottom than at the top, a chamber for said mechanism having its walls so disposed relative to the walls of the form as to accelerate movement of fluid currents past said mechanism.

43. A refrigerator comprising a refrigerating mechanism and a container therefor, air passages in said container, said mechanism having an air directing wall mounted in progressively decreasing spaced relation to a wall of the container along the line of flow, to accelerate flow of air through said passages.

In testimony whereof I hereunto affix my signature.

REUBEN E. OTTENHEIMER.